US008706090B2

(12) United States Patent
Boyer et al.

(10) Patent No.: US 8,706,090 B2
(45) Date of Patent: Apr. 22, 2014

(54) METHOD AND APPARATUS FOR DELIVERING A VOICE MAIL MESSAGE WITH AN INDICATION OF THE PRESENCE OF THE SENDER

(75) Inventors: David G. Boyer, Oceanport, NJ (US); Shabbir A. Khakoo, Morganville, NJ (US); Latha Ravishankar, Jersey City, NJ (US); Prem Sumetpong, Hazlet, NJ (US)

(73) Assignee: Avaya Inc., Basking Ridge, NJ (US)

( * ) Notice: Subject to any disclaimer, the term of this patent is extended or adjusted under 35 U.S.C. 154(b) by 604 days.

(21) Appl. No.: 10/672,633

(22) Filed: Sep. 26, 2003

(65) Prior Publication Data
US 2005/0070254 A1 Mar. 31, 2005

(51) Int. Cl.
*H04M 11/10* (2006.01)
(52) U.S. Cl.
USPC ............................................. 455/413
(58) Field of Classification Search
CPC ............ H04M 3/53333; H04M 3/42093; H04M 3/42374; H04M 3/53341
USPC ........... 455/413, 414.1, 418, 419, 450, 452.2, 455/509, 464, 67.11, 411, 453, 67.13; 706/11, 45, 47, 927; 434/118; 370/401, 370/359, 419, 200.49, 469, 237, 343, 453, 370/392, 329, 252, 310, 520, 450, 452.2, 370/241, 408, 328, 235, 230.1, 331, 260, 370/389, 254, 340, 336, 242, 232; 345/329, 345/330–331, 229; 379/202.01, 88.19
See application file for complete search history.

(56) References Cited

U.S. PATENT DOCUMENTS

| 5,889,845 | A | | 3/1999 | Staples et al. |
| 5,987,443 | A | * | 11/1999 | Nichols et al. ................. 706/11 |
| 6,021,176 | A | | 2/2000 | McKendry et al. |
| 6,076,093 | A | | 6/2000 | Pickering |
| 6,188,888 | B1 | | 2/2001 | Bartle et al. |
| 6,718,014 | B2 | * | 4/2004 | Haim ........................ 379/88.15 |
| 7,447,495 | B2 | * | 11/2008 | Agrawal ................... 455/412.2 |
| 2002/0076010 | A1 | * | 6/2002 | Sahai ........................ 379/88.19 |
| 2002/0083127 | A1 | | 6/2002 | Agrawal |
| 2002/0118671 | A1 | * | 8/2002 | Staples et al. ................ 370/352 |
| 2003/0185360 | A1 | * | 10/2003 | Moore et al. ............. 379/114.01 |

(Continued)

OTHER PUBLICATIONS

Yahoo! Mail webpage, downloaded from yahoo.com on Feb. 23, 2003.

(Continued)

*Primary Examiner* — Melody Mehrpour (57) ABSTRACT

A method and apparatus are disclosed for delivering voice mail messages to one or more intended recipients with an indication of the presence of the sender. A message recipient can automatically respond to a voice mail message using a desired form of communication. The presence server can provide presence information across domains so that a user in one domain can automatically obtain presence information and respond to a user in another domain. A client-side presence enabled voice mail application process (i) retrieves voice mail messages from a voice mail server of a user, (ii) queries a presence server to determine the presence of the sender of each retrieved message, and (iii) presents the retrieved voice mail message(s) to the recipient with an indication of the presence of the sender. In addition, the disclosed presence enabled voice mail application process allows the message recipient to automatically respond, for example, by an email, instant message or telephone call to a device where the sender is believed to be present.

24 Claims, 5 Drawing Sheets

(56) References Cited

U.S. PATENT DOCUMENTS

| | | | |
|---|---|---|---|
| 2004/0196833 A1* | 10/2004 | Dahan et al. | 370/352 |
| 2005/0068167 A1* | 3/2005 | Boyer et al. | 340/531 |
| 2007/0121808 A1* | 5/2007 | Brunson et al. | 379/67.1 |
| 2007/0167170 A1* | 7/2007 | Fitchett et al. | 455/456.1 |

OTHER PUBLICATIONS

Hyam, Kristy, "CA Application No. 2,472,808 Office Action Mar. 1, 2007", , Publisher: CIPO, Published in: CA.

Hyam, Kristy, "CA Application No. 2,472,808 Office Action Mar. 17, 2009", , Publisher: CIPO, Published in: CA.

Gravelle, Mara, "CA Application No. 2,472,808 Office Action Apr. 24, 2008", , Publisher: CIPO, Published in: CA.

"EP Application No. 04255210.9 Office Action Dec. 21, 2005", , Publisher: EPO, Published in: EP.

Willems, B., "EP Application No. 04255210.9 European Search Report Jan. 12, 2005", , Publisher: EPO, Published in: EP.

Hyam, Kristy, "CA Application No. 2,472,808 Office Action Jun. 16, 2010", , Publisher: CIPO, Published in: CA.

Jeffery, John A., "U.S. Appl. No. 10/672,635 Decision on Appeal Jul. 17, 2008", , Publisher: USPTO, Published in: US.

La, Anh V., "U.S. Appl. No. 10/672,635 Evidence Relied Upon by Examiner Oct. 18, 2007", , Publisher: USPTO, Published in: US.

La, Anh V., "U.S. Appl. No. 10/672,635 Examiner's Answer to Appeal Brief May 17, 2006", , Publisher: USPTO, Published in: US.

La, Anh V., "U.S. Appl. No. 10/672,635 Office Action Mar. 28, 2005", , Publisher: USPTO, Published in: US.

La, Anh V., "U.S. Appl. No. 10/672,635 Office Action Sep. 19, 2005", , Publisher: USPTO, Published in: US.

Nolan, Patrick J., "U.S. Appl. No. 10/672,635 Order Returning Undocketed Appeal to Examiner Jul. 6, 2007", , Publisher: USPTO, Published in: US.

* cited by examiner

PRESENCE DATABASE – 400

| USER NAME 430 | PRESENCE STATUS 440 | DEVICE ADDRESS 450 | DEVICE CAPABILITY 460 | VOICE MAILBOX 470 |
|---|---|---|---|---|
| ... | ... | ... | ... | ... |
| USER A | BUSY | TEL: (732)-555-1212 | VOICE | 732-555-1212 |
|  | AWAY | SIP: usera@laptop.abccorp.com | VOICE/TEXT | 7325551212@voicemail.abccorp.com usera@abccorp.com |
|  | ONLINE | SMTP: usera@abccorp.com | TEXT | usera@abccorp.com |
| ... | ... | ... | ... | ... |

METHOD AND APPARATUS FOR DELIVERING A VOICE MAIL MESSAGE WITH AN INDICATION OF THE PRESENCE OF THE SENDER

CROSS-REFERENCE TO RELATED APPLICATIONS

The present application is related to "Method and Apparatus for Delivering an Electronic Mail Message With an Indication of a Presence Status of a Sender," U.S. patent application Ser. No. 10/672,636 and "Programmable Presence Proxy for Determining a Presence Status of a User," U.S. patent application Ser. No. 10/672,635, each incorporated by reference herein.

FIELD OF THE INVENTION

The present invention relates generally to methods and systems for delivering voice mail messages over a network, and more particularly, to methods and systems that deliver voice mail messages to one or more intended recipients with an indication of the presence or availability of the sender.

BACKGROUND OF THE INVENTION

When one person calls another person, the call will often go to call coverage, such as a voice mail system or live receptionist, or result in a busy signal. In an enterprise communication system, for example, callers must often leave a voice mail message for the intended recipient. Currently available voice mail applications typically allow the message recipient to automatically respond to the message sender by placing another telephone call or sending a reply voice mail message to the message sender. Such voice mail applications, however, do not provide a mechanism for determining the availability of a particular person. Thus, the message recipient lacks the necessary information to make an informed decision about the best way to reach the message sender. The message recipient may still not reach the message sender, for example, if the message sender is not there or is unavailable.

Instant messaging systems generally provide a mechanism for determining whether a message recipient is "present." See, for example, Atkins et al., "Introducing Instant Messaging and Presence Into the Workplace," Proc. of the Conf. on Human Factors in Computing Systems, Minneapolis, Minn., USA, ACM CHI 2002 (Apr. 20, 2002), downloadable from http://www.informatik.uni-trier.de/~ley/db/conf/chi/chi2002.html. The instant messaging system provided by America Online, for example, provides both an instant message function and a presence awareness function. The presence information allows the recipient of an instant message to determine whether the sender of the instant message is currently available (i.e., logged on to the AOL service) to receive additional instant messages. In addition, a number of instant messaging systems allow a user to provide a text message indicating his or her current availability, such as "out to lunch," or "in a meeting." Thus, the users of instant messaging systems can make more informed decisions about how to best communicate with an intended recipient. Unlike instant messaging systems, however, voice mail systems typically do not allow a message recipient to determine whether the message sender is currently present.

A need therefore exists for methods and systems that deliver voice mail messages to one or more intended recipients with an indication of the presence of the sender. A further need exists for voice mail methods and systems that allow a message recipient to automatically respond to a message sender at a communication device where the message sender is believed to be present.

SUMMARY OF THE INVENTION

Generally, a method and apparatus are disclosed for delivering voice mail messages to one or more intended recipients with an indication of the presence of the sender. The provided presence information allows the recipient to better determine the best way to respond to the message. The presence information may indicate, for example, if the message sender can currently be reached by email, instant message, a telephone call or a further voice mail message. The present invention increases productivity by enabling a better selection of the best way to respond to a voice mail message. If the message sender is present for a real time communication, for example, the message recipient can choose a real time or near real time mode of communicating, such as a telephone call or instant message. Otherwise, the message recipient can select a non-real time mode of communicating, such as a reply email message, voice mail message or a page.

According to another aspect of the invention, a message recipient can automatically respond to a voice mail message using a desired form of communication, such as a telephone call to a telephone where the sender is believed to be present. Furthermore, the presence server can provide presence information across domains so that a user in one domain (such as the customers of one Internet Service Provider) can automatically respond in real-time or non-real time to a user in another domain (such as the customers of another Internet Service Provider). In one implementation, a client-side presence enabled voice mail application process (i) retrieves voice messages from a voice mail server of a user, (ii) queries a presence server to determine the presence of the sender of each retrieved message, and (iii) presents the retrieved voice message(s) to the recipient, for example, in an "in-box," with an indication of the presence of the sender. In addition, the disclosed presence enabled voice mail application process allows the message recipient to automatically respond, for example, by an email, instant message, telephone call or voice mail to a device where the sender is believed to be present.

A more complete understanding of the present invention, as well as further features and advantages of the present invention, will be obtained by reference to the following detailed description and drawings.

DETAILED DESCRIPTION

Figure 1:
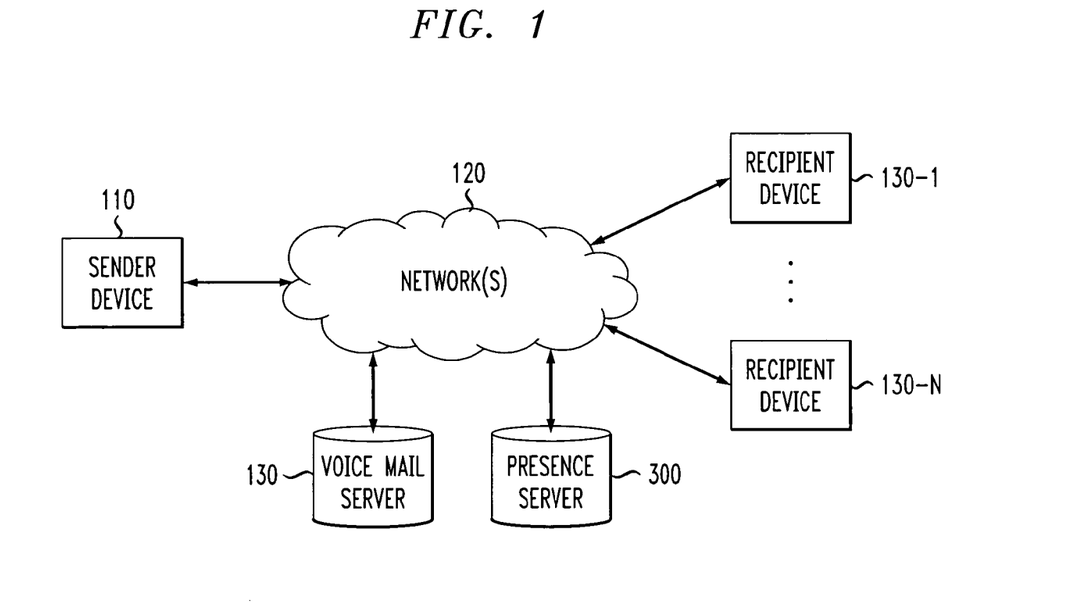
FIG. 1 illustrates a network environment in which the present invention can operate.

FIG. 1 illustrates the network environment in which the present invention can operate. As shown in FIG. 1, a sender employing a sender device 110 leaves a voice mail message over a network 120 for one or more intended recipients, each employing a corresponding recipient device 130-1 through 130-N, discussed below in conjunction with FIG. 2. The voice mail message is typically delivered to a "mailbox" of a voice mail server 130 associated with a corresponding recipient. The recipient must generally log into the voice mail server 130 to access the voice mail messages, in a known manner. The network(s) 120 may be any combination of wired or wireless networks, such as the Internet and the Public Switched Telephone Network (PSTN). The voice mail server 130 typically serves a community of users, such as the employees within an enterprise or the customers of a telephone Service Provider. While the present invention is described in the context of a voice mail message system, it will be understood by those of ordinary skill in the art that the present invention encompasses other types of messages and is not limited to voice mail messages.

According to one aspect of the invention, a voice mail message is delivered to each recipient with an indication of the presence or availability of the sender. As used herein, the term "presence" shall mean the representation of a state characterizing the existence of an active device through which a user can communicate or through which presence can be detected. The state is specific to a particular communication service, such as email, voice mail or instant messaging, or presence detection service, such as audio-visual detection, GPS devices or heat sensors. Users may have multiple active communication devices.

The provided presence information allows the recipient to better determine the best mode of communication to use when responding to the communication. In this manner, productivity is enhanced by enabling a better selection of the best way to respond to the voice mail message communication. If the message sender is present for a real time communication, for example, the message recipient can choose a real time or near real time mode of communicating, such as a telephone call or instant message. Otherwise, the message recipient can select a non-real time mode of communicating, such as a reply email message, voice mail message or a page. This informed choice leads to a more efficient, productive and cost effective communication. According to another aspect of the invention, a message recipient can automatically respond to a voice mail message using a desired form of communication, such as a telephone call to a telephone where the sender is believed to be present.

As previously indicated, a voice mail message generally comprises audio message content and one or more indicated recipients. The voice mail message is received by the voice mail server 130 over the network 120 and is routed to the voice mail box corresponding to each indicated recipient. In one exemplary implementation, a client-side presence enabled voice mail application process 600, as discussed further below in conjunction with FIG. 6, associated with each recipient (i) retrieves voice mail messages from the voice mail server 130, (ii) queries a presence server 300, discussed below in conjunction with FIG. 3, to determine the presence of the sender of the retrieved voice mail message, and (iii) presents the retrieved voice mail message to the recipient, for example, in an "in-box," with an indication of the presence of the sender.

Figure 6:
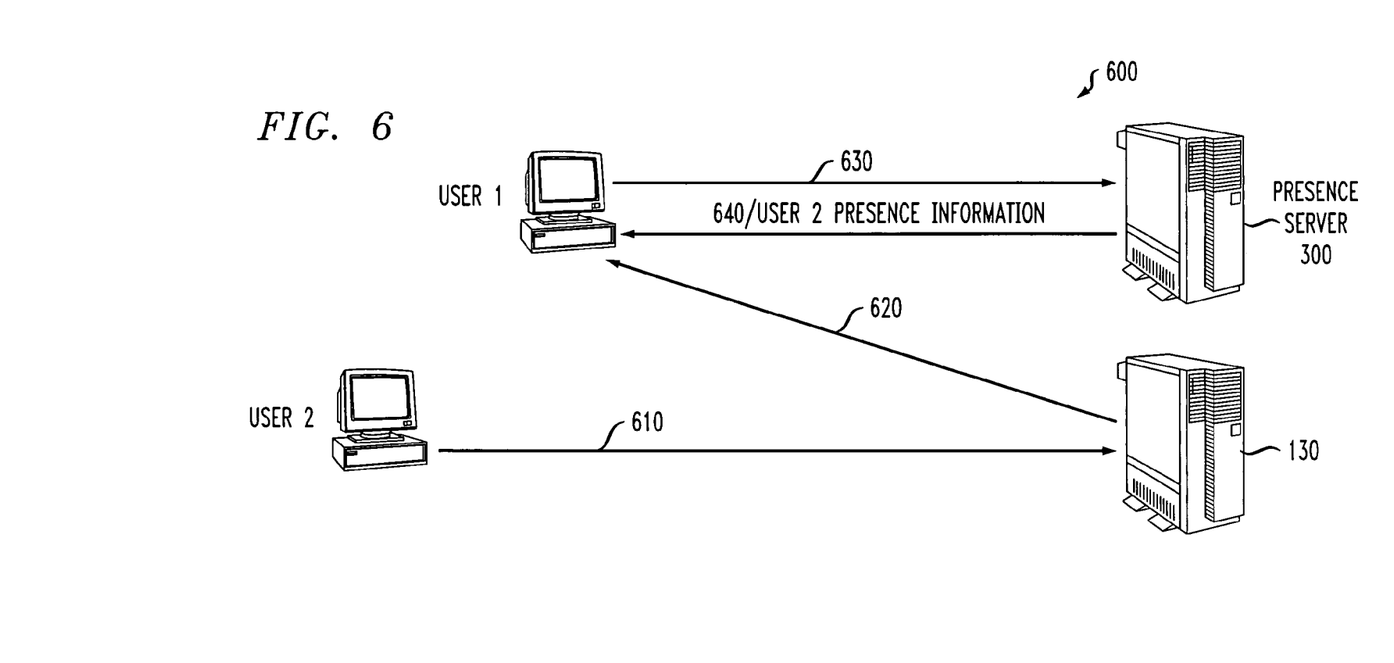
FIG. 6 is a flow chart describing an exemplary implementation of the client-side presence enabled voice mail application process of FIG. 2.

In addition, the presence enabled voice mail application process 600 allows the message recipient to automatically respond, for example, by an email, instant message, telephone call or further voice mail message to a device where the sender is believed to be present. In the context of a voice mail system, presence information is generally most useful if presented to the voice mail message recipient when the recipient is listening to the message. However, other variations are possible and within the scope of the present invention. Generally, the presence server 300 records presence information for each user in a given community, such as the availability of each user to receive email messages, instant messages, telephone calls or further voice mail messages to one or more indicated addresses.

It is noted that the community served by the voice mail server 130 is typically not the same community as that served by the presence server 300. In fact, it is an object of the present invention that the presence server 300 is based on an open standard that provides presence information beyond any single community served by a single voice mail server 130. Thus, the presence server 300 can provide presence information across domains so that a user in one domain (such as the customers of one Internet Service Provider) can automatically respond in real-time or non-real time to a user in another domain (such as the customers of another Internet Service Provider). In this manner, the presence server 300 is not tied to any given voice mail system, and thus the presence server 300 can support any voice mail client. In an alternate server-side implementation, the voice mail server 130 can automatically provide the voice mail message with an indication of the presence of the sender.

Figure 2:
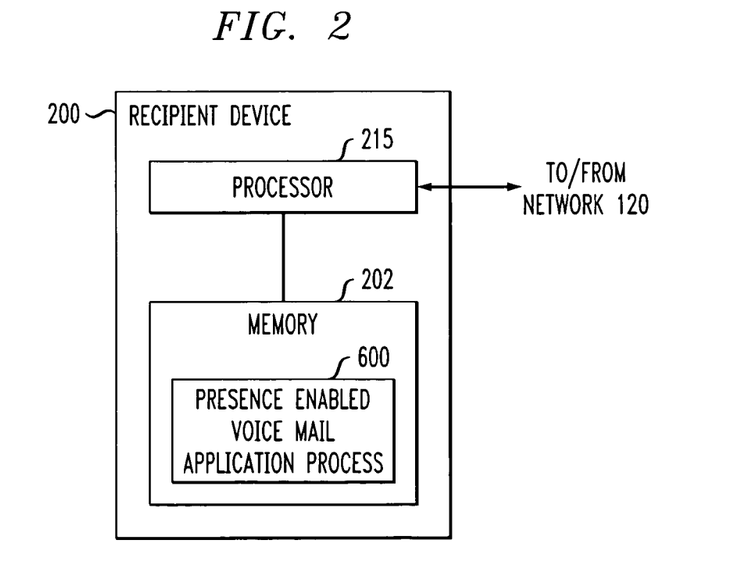
FIG. 2 is a schematic block diagram of an exemplary recipient device of FIG. 1 incorporating features of the present invention.

FIG. 2 is a schematic block diagram of an exemplary recipient device 130-1 incorporating features of the present invention. The recipient device 130-1 may be any communication device, such as a telephone, personal computer or personal digital assistant. As shown in FIG. 2, the exemplary recipient device 130-1 includes a processor 215 and a memory 202, in addition to other conventional elements (not shown). The processor 215 operates in conjunction with the memory 202 to execute one or more software programs. Such programs may be stored in memory 202 or another storage device accessible to the recipient device 130-1 and executed by the processor 215 in a conventional manner. For example, as discussed below in conjunction with FIG. 6, the memory 202 may store a presence enabled voice mail application process 600 that (i) retrieves a voice mail message for the recipient associated with the device 130-1 from the voice mail server 130, (ii) queries a presence server 300, discussed below in conjunction with FIG. 3, to determine the presence of the sender of the retrieved voice mail message, and (iii) presents the voice mail message to the recipient with an indication of the presence of the sender. A suitable user interface that may be employed by the presence enabled voice mail application process 600 to present retrieved voice mail messages, together with an indication of the presence of the sender, is discussed below in conjunction with FIG. 7.

Figure 3:
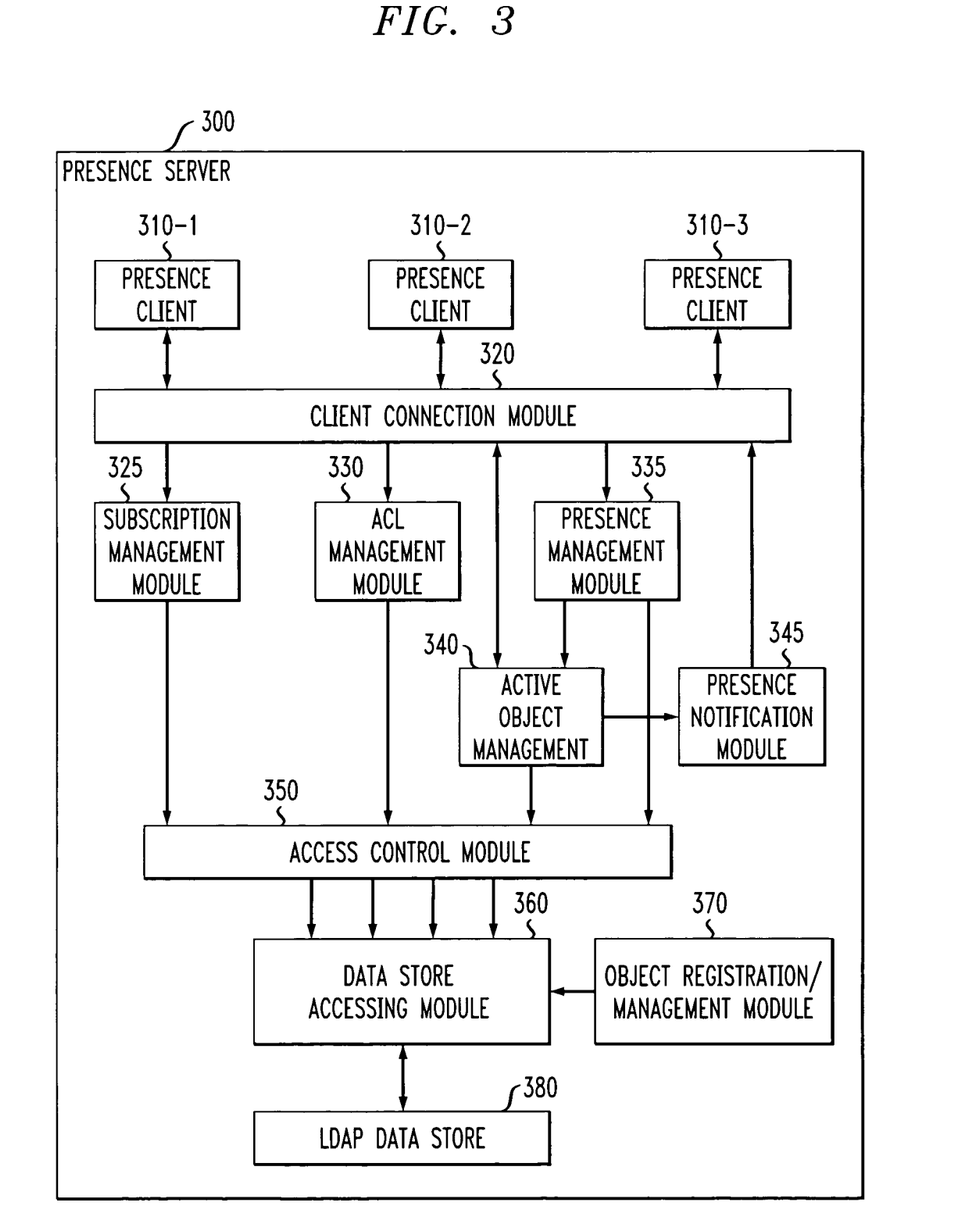
FIG. 3 is a schematic block diagram of an exemplary presence server of FIG. 1 incorporating features of the present invention.

As previously indicated, the presence server 300 records presence information for each user in a given community. For example, the recorded presence information may include the availability of each user to receive voice mail messages, emails, instant messages or telephone calls to one or more indicated addresses or telephone numbers. The presence server 300 can track real time changes in the presence status of each user that is used by the present invention to provide better communication when responding to a voice mail message. The exemplary presence server 300 is implemented in accordance with the specifications of the emerging PAM architecture, described, for example, at www.pamforum.org. For example, the presence server 300 may be embodied in accordance with the teachings of David Boyer et al., "Presence Awareness for Future Telecommunication Systems", Chapter in Virtual Reality Technologies for Future Telecommunications Systems, Algirdas Pakstas and Ryoichi Komiya (Eds.), John Wiley & Sons, LTD, (2002); or Mark Handel et al., "Requirements for Presence Awareness: The RVM Model," http://www-personal.si.umich.edu/~handel/research/rvm/documents/rvm-model.pdf (or accessible through a keyword search on google.com), each incorporated by reference herein.

As shown in FIG. 3, the presence server 300 includes a client connection module 320 that is responsible for managing client connections. The client connection module 320 facilitates communication between the presence server 300 and each client. In the exemplary implementation shown in FIG. 3, the client connection module 320 supports three client interfaces 310-1 through 310-3. A first client interface 310-1 provides a 'persistent' interface for presence applications. A persistent connection is maintained between the client and the server 300. A heartbeat mechanism can be utilized to make the system robust to network outages. Notifications are also sent via the first client interface 310-1. If a subscribed-to-users presence status changes (a new device is now available for communication), the user's client is sent a notification to indicate this.

A second client interface 310-2 supports non-persistent User Datagram Protocol (UDP) communications via a Session Internet Protocol (SIP) proxy that provides notifications and registration to a well-known port number via the SIP notification and register protocol. See, J. Rosenberg et al., "SIP Extensions for Presence," IETF Internet Draft, dragft-rosenberg-impp-presence-00.txt (Jun. 15, 2000). A third non-persistent client interface 310-3 supports "thin" Web clients. A thin client does not support notifications. The client queries the server 300 periodically to see if the presence status of any of the parties that the user subscribes to has changed.

In addition, the presence server 300 includes a subscription management module 325 that is responsible for managing subscriptions. A subscription list, often referred to as a "buddy list," is a list of the people, groups and Web pages to whose presence and availability a user has subscribed. Examples include a stock price when it hits a certain level, the availability of a document when it is ready and the nearest fax machine that is not in use. A user might also subscribe to different applications that a user has access to or features of systems that change. For example, a user may want to know when someone hangs up his or her telephone (the identity subscribes to an agent's on-hook field). Subscriptions should also be permitted to an agent's presence information that might be considered to be networked appliances. For example, a homeowner could subscribe to a remote electronic doorbell.

The subscription management module 325 has a number of related modules, that let a user manage groups and buddy lists. The subscription management module 325 supports the availability of specific communication capabilities and, given the right permissions, a user can receive presence information about specific communications capabilities. A presence management module 335 allows a presence client to register or unregister its presence. Different clients can register unique devices and capabilities for a given user. Some clients can detect when a user has been idle. The presence module 335 is updated when an idle threshold is reached.

A presence notification module 345 notifies the clients about the presence change of other clients (or devices), that subscribed to the presence of the client. Notifications of presence state changes are sent to subscribed and on-line watchers (for the interfaces that support notifications). Users are also notified when someone they have been watching changes their accessibility to that user. If a user stops allowing a watcher to receive his/her presence information, the watcher is notified of this change in real time. This also applies to groups. The watcher of a group is sent a notice when his/her group membership is terminated.

An active object management module 340 maintains a list of currently connected clients and synchronizes the information with the data store. The object management module 340 also tracks active groups. When a user logs on, all groups that the user is a member of are updated to indicate his/her presence. If the user is the first present member in the group, the group now becomes active.

An access control list (ACL) management module 330 allows the users to manage their access control lists. An access control list lets a user indicate who they will allow to "watch" them (i.e., receive his or her presence information). It is important in an enterprise setting, for example, to allow users to specify who (other users and groups) is permitted to receive their presence data (note that this does not mean that all the users on the list will actually elect to subscribe to this user). Both 'Allow Lists' (no one except X, Y and Z is allowed access to my presence and availability information) and 'Deny Lists' (everyone except X, Y and Z is allowed access to my presence and availability information) are typically needed for Enterprise applications. Alternatively, a system might require users to grant a user's request for presence data in real time—a user is sent a message saying someone wants to add them to their subscription list and is asked to grant or not grant permission.

In most systems, a user receives a notification when a new user wants to receive their presence information. This requires an explicit action each time a user wants to reject the subscription of another user to their information. In an enterprise setting, this may not be appropriate. An ACL system is used that allows only those users and groups to receive information for which this permission had been initially granted. Users can, if they desire, toggle this setting so that everyone gets their presence information except those who are explicitly listed as people who should not be permitted access to such data, in a known manner. For a group, the ACL list is used to indicate who is allowed to join the group. The member list is a list of those users who have actually joined the group. A group may be are open for anyone to join or may have a list of people who are allowed to join; yet everyone on the list may not elect to join the group. Groups can also have a separate subscription list.

A datastore accessing module 360 provides a common interface through which all the data access takes place. A Lightweight Directory Access Protocol (LDAP) datastore 380 is actively supported. The LDAP datastore 380 is a persistent repository for storing the information about the objects registered with the server. It is noted that new fields can be added to any object by a client. New fields do not require any changes to the presence server 300 (new fields are automatically created). These fields can also be subscribed to by a client.

The LDAP datastore 380 provides a presence database 400, as discussed further below in conjunction with FIG. 4, for each user in the community that indicates the availability of that user for receiving communication. For each user, the presence entry indicates whether the user is present and on what device. The presence status may indicate, e.g., whether the user is present, busy, away or gone (where "away" indicates that the user is around the physical location, but has stepped out briefly and "gone" indicates that the system has no knowledge of the presence of the user). The device address tab indicates the address of each device that is available. The presence server updates the presence and device address entries based either on automatic detection of presence of the user or by a process of manual registration by the user. If so, the presence server 300 is able to determine the address at which the user is available and the capabilities of the device at that address. For example, the presence server 300 can use information gathered from user log-ins, either to a machine or an application (or both) to determine presence information. In addition, determinable user activity, such as telephone, keyboard or mouse activity, provides presence information. In an enterprise setting, a private branch exchange (PBX) switch can be monitored for a user's telephone usage and to initiate phone calls. A user's cellular telephone can be monitored to provide data on where the user is currently physically located.

The datastore accessing module 360 provides a generic interface to such different back-end datastores. An object registration and management module 370 is used to create and manage objects (users, groups, devices) and their information. Each user, group and device is represented in the system by objects. An access control module 350 ensures that an invoking object is authorized to access requested information before any information is accessed about any object.

Figure 4:
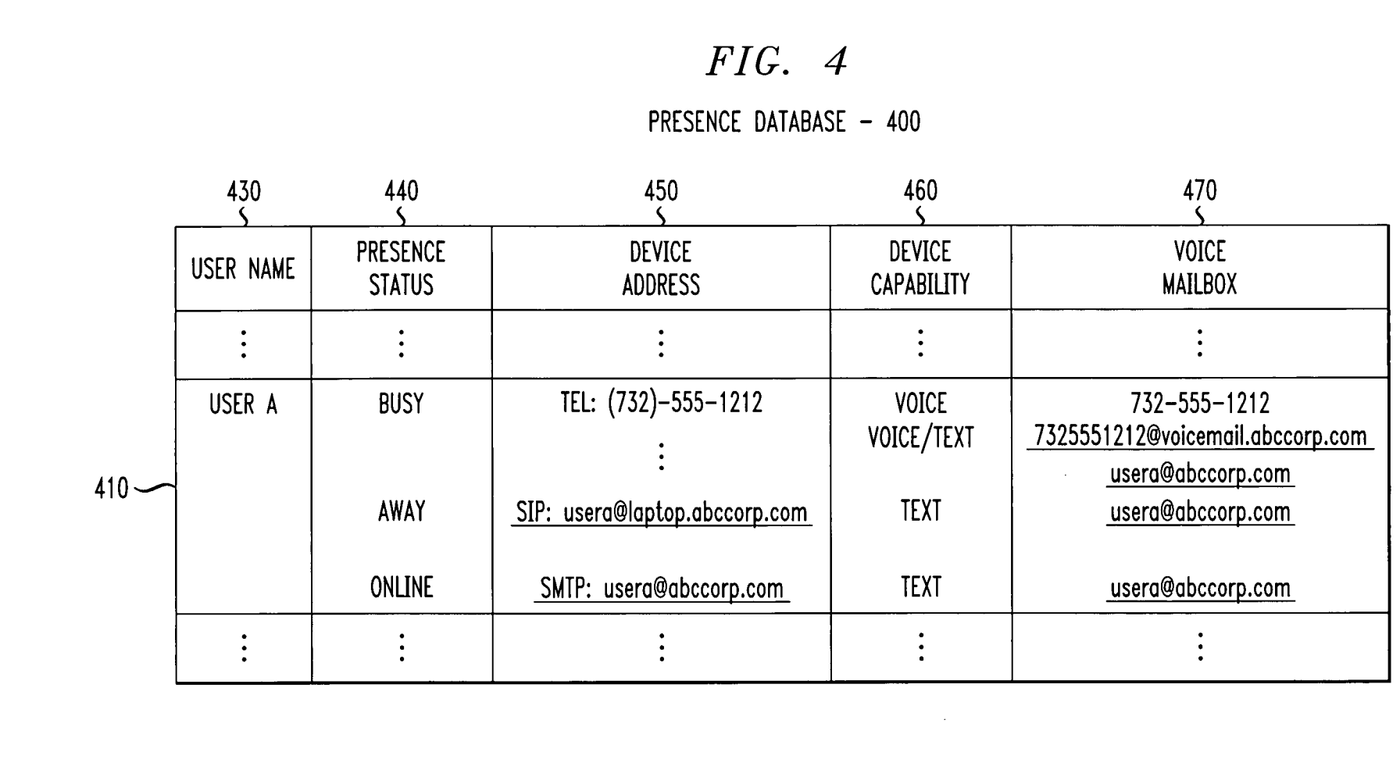
FIG. 4 is a sample table from an exemplary presence database of FIG. 1.

FIG. 4 is a sample table from an exemplary presence database 400 maintained by the presence server 300. As indicated above, the presence database 400 maintains information for each user in the community, including the availability of each user to receive instant messages. As shown in FIG. 4, the presence database 400 includes a plurality of records, such as record 410, each associated with a different user. For each user, identified, for example, by name in field 430, the presence database 400 indicates the user's presence in field 440, corresponding device address and capabilities in fields 450 and 460, respectively, and the user's voice mailbox in field 470. The presence entry in field 440 indicates whether the user is present at a given device registered for the user. The device address in field 450 indicates the address of each device that is available for receiving instant messages for the user. The address can be any location or connection means, such as a phone number or URL, for example. The device capability in field 460 indicates the capability of the device, such as whether the device is text or voice or video capable (or some combination of the foregoing), including email and fax capable devices. Finally, the voice mailbox in field 470 indicates the address of the voice mailbox for the user.

Figure 5:
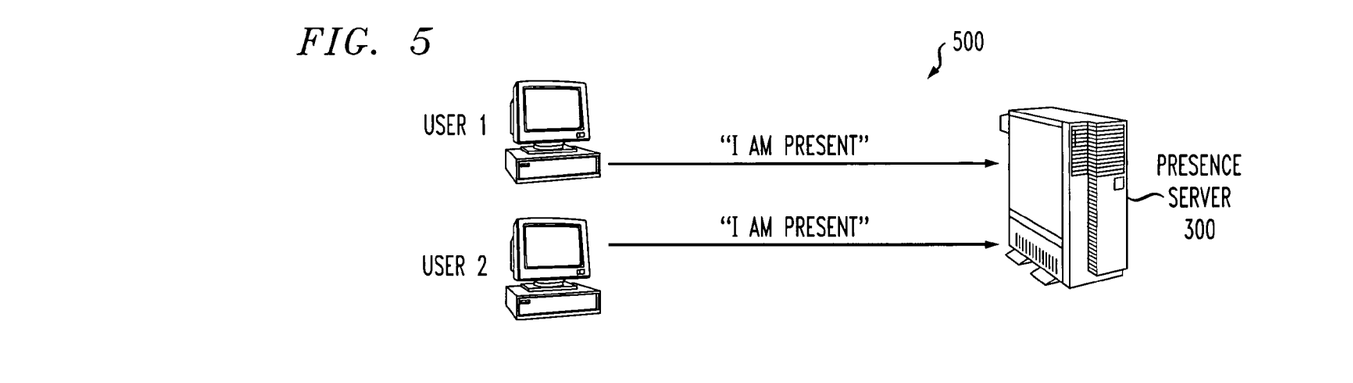
FIG. 5 illustrates an exemplary "login" process that can be used by users to register with the presence server of FIG. 3.

As previously indicated, the presence server 300 updates the presence and device address entries based on the automatic detection of the presence of the user or by a process of manual registration by the user, in any known manner. Thus, the presence server 300 is always able to determine whether a user is present. If present, the server 300 is able to determine the address at which the user is available and the capabilities of the device at the address. In addition, the manual registration process allows a user to prioritize the indicated device and presence information, thereby allowing instant messages to be delivered in accordance with the user's preferences. It is noted that the presence database 400 can include a SIP registry database FIG. 5 illustrates an exemplary "login" process 500 that can be used by users to affirmatively register with the presence server 300. The "login" process 500 enables a user such as user 1 or user 2 to declare to the presence server 300 that he or she is present by sending an appropriate message to the presence server 300.

FIG. 6 is a flow chart describing an exemplary implementation of the client-side presence enabled voice mail application process 600. Generally, the presence enabled voice mail application process 600 queries for the presence of the sender of a voice mail message. In this manner, the presence enabled voice mail application process 600 can be said to make a voice mail client incorporating the presence enabled voice mail application process 600 a presence fetcher, as defined by IETF RFC 2278.

As shown in FIG. 6, user 2 initially leaves a voice mail message for one or more indicated recipients (including user 1) during step 610. Thereafter, the voice mail client of user 1 fetches the voice mail message from user 1's voice mailbox on the voice mail server 130 during step 620. The voice mail client also queries the presence server 300 to determine the presence of the sender (user 2) of the retrieved voice mail message during step 630. The presence server 300 responds with the presence information during step 640. Finally, the retrieved voice mail message is presented to the recipient (user 1), for example, in an "in-box," with an indication of the presence of the sender.

Figure 7:
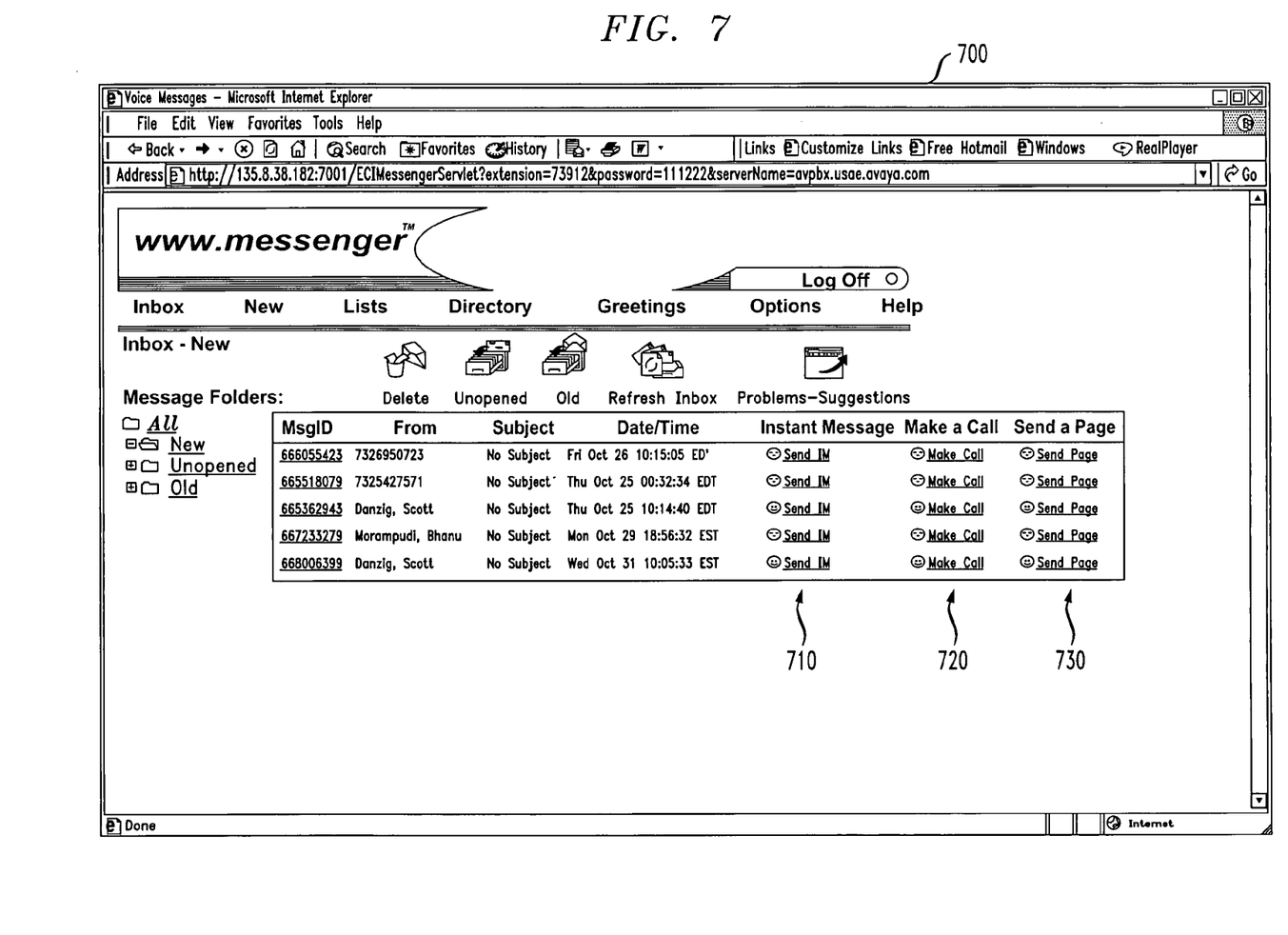
FIG. 7 is a user interface incorporating features of the present invention.

FIG. 7 illustrates an exemplary user interface 700 used by a voice mail client incorporating features of the present invention. The voice mail client may be embodied, for example, as the Unified Communications Center, commercially available from Avaya Inc. of Basking Ridge, N.J., as modified herein to provide the presence awareness features and functions of the present invention. As shown in FIG. 7, the exemplary user interface 700 includes a number of conventional fields for presenting voice mail messages to a user, such as a message identifier, subject, sender and date. In addition, the user interface 700 in accordance with the present invention includes additional fields that support the features of the present invention.

In an exemplary implementation, presence information is automatically presented to the user, e.g., for each new voice mail message appearing in the list of voice mails message presented in the user interface 700. As shown in FIG. 7, for each received message, the exemplary user interface 700 indicates whether the message sender is currently available (e.g., at the time the message is retrieved) to receive an instant message (IM), telephone call or a page in fields 710, 720 and 730, respectively. In this manner, presence information is made available on the voice mail client and this information can be fetched for the originator of the message. In a further variation, presence information can be obtained about the sender of a given message by providing a button on the interface 700 that automatically retrieves such presence information.

It is to be understood that the embodiments and variations shown and described herein are merely illustrative of the principles of this invention and that various modifications may be implemented by those skilled in the art without departing from the scope and spirit of the invention.

We claim:

1. A method for delivering a voice mail message to a recipient, comprising:
   receiving the voice mail message from a sender;
   obtaining a presence status of the sender from a presence server; and
   delivering the voice mail message to the recipient via a non-instant messaging environment with an indication of a presence of the sender, the indication comprising an identification of a device where the sender is present.

2. The method of claim 1, wherein the presence server extracts presence information from a plurality of presence data stores.

3. The method of claim 2, wherein the presence server translates the presence information to a standard format.

4. The method of claim 1, wherein the presence server determines the presence status of the sender based a rule that aggregates extracted presence information.

5. The method of claim 1, wherein the recipient responds to the sender in another domain.

6. The method of claim 1, wherein the presence information indicates if the message sender can be reached at an indicated device.

7. The method of claim 1, wherein the presence information is obtained from the sender via a registration process.

8. The method of claim 1, wherein the presence information is obtained by observing activities of the sender.

9. The method of claim 1, wherein the recipient can respond to the sender in real time.

10. The method of claim 1, wherein the recipient can respond to the sender in non-real time.

11. The method of claim 1, wherein the recipient can respond to the sender using non-textual communication.

12. A method for delivering a voice mail message to a recipient, comprising:
   receiving the voice mail message from a sender via a non-instant messaging environment;
   obtaining a presence status of the sender; and
   providing a mechanism for the recipient to automatically respond to the sender at a device where the sender is believed to be present.

13. The method of claim 12, wherein providing the mechanism for the recipient to automatically respond further comprises allowing the recipient to respond to the sender in another domain.

14. The method of claim 12, wherein the recipient can respond to the sender in real time.

15. The method of claim 12, wherein the recipient can respond to the sender in non-real time.

16. The method of claim 12, wherein the recipient can respond to the sender using non-textual communication.

17. An apparatus for delivering a voice mail message to a recipient, comprising:
   a memory; and
   at least one processor, coupled to the memory, operative to:
      receive the voice mail message from a sender;
      obtain a presence status of the sender from a presence server; and
      deliver the voice mail message to the recipient via a non-instant messaging environment with an indication of a presence of the sender, the indication including an identification of a device where the sender is present.

18. The apparatus of claim 17, wherein the presence server extracts presence information from a plurality of presence data stores.

19. The apparatus of claim 18, wherein the presence server translates the presence information to a standard format.

20. The apparatus of claim 17, wherein the presence server determines the presence status of the sender based on a rule that aggregates extracted presence information.

21. The apparatus of claim 17, wherein the recipient responds to the sender in another domain.

22. The apparatus of claim 17, wherein the presence information indicates if the message sender can be reached at an indicated device.

23. The apparatus of claim 17, wherein the recipient can respond to the sender using non-textual communication.

24. The apparatus of claim 17, wherein the presence status indicates a presence status of the sender across a plurality of domains.

* * * * *